Oct. 28, 1969    D. F. SIDDALL ET AL    3,474,760
MILKING INFLATION

Filed Nov. 3, 1967    2 Sheets-Sheet 1

INVENTORS
DON F. SIDDALL
VINCENT L. HOFFMAN
BY
Meyer, Tilberry & Body
ATTORNEYS.

INVENTORS
DON F. SIDDALL
VINCENT L. HOFFMAN
BY
Meyer, Tilberry & Body
ATTORNEYS.

United States Patent Office 3,474,760
Patented Oct. 28, 1969

3,474,760
MILKING INFLATION
Don F. Siddall, Bath, and Vincent L. Hoffman, Akron, Ohio, assignors, by mesne assignments, to Norton Company, a corporation of Massachusetts
Filed Nov. 3, 1967, Ser. No. 680,531
Int. Cl. A01j 5/04
U.S. Cl. 119—14.49          10 Claims

ABSTRACT OF THE DISCLOSURE

An elastomeric vinyl plastic milking inflation having a body portion, a head portion and a flexile collar extending inwardly from the point of merger of the body and head portions; and a plurality of fingers on the inner periphery of the collar which are withdrawn when the collar is in a relaxed position, and which extend inwardly of the periphery when the collar distends toward a flexed position.

---

This invention relates to the art of automatic milking equipment and more particularly to an improved milking inflation.

The invention finds utility in a variety of milking machines of conventional design. All of these machines operate on the same general principle of applying periodic and alternating positive and negative massaging pressure to a teat-enrobing, flexible, resilient, milking inflation. This action induces a letdown of milk which is then suitably collected.

While in some instances the massaging pressure is developed by mechanical means, pulsating vacuum pressure is more widely used. In vacuum-actuated equipment, at least a portion of the milking inflation is encased in a rigid shell, the ends of which are in pressure sealing engagement with the inflation. Suitable means are provided for communicating the chamber formed between the shell and the inflation with a source of pulsating vacuum.

The milking inflation is recognized to be the most critical component of automatic milking equipment. This is due to the fact that the inflation must satisfy a broad and comprehensive spectrum of physiological, chemical and physical criteria.

In relation to the cow, the texture and "feel" of the inflation must be such as to induce the animal to letdown its milk. The inflation must be structurally and chemically non-irritating to the rather sensitive tissue forming the cow's udder and teats.

In relation to raw, fresh milk, which is more reactive than milk which has been exposed to air for a period of time, the inflation must be chemically and physically inert, non-absorptive and insoluble.

In relation to cleaning and sanitizing agents with which the inflation is treated daily, the component must be chemically and physically inert. The inflation should not absorb or otherwise retain these agents, which if carried over to the milking operation could cause irritation to the cow and/or contamination of the milk.

In relation to the mechanics of the milking operation, the inflation must be able to undergo repeated flexing cycles without distorting, cracking, or otherwise failing through fatigue.

Heretofore, most milking inflations have been made from natural or synthetic rubber. Not because these materials satisfy all of the above criteria, but because they strike the best compromise of properties among all elastomers previously considered useful for this application.

The three main drawbacks of rubber are butterfat absorption, opacity, and oxidative degradation. When exposed to air at ambient temperatures, butterfat is readily degraded by bacteria present in raw milk as well as by airborne bacteria. The degradation not only produces undesirable by-products and bacterial elaborations, but causes a proliferation of the bacteria.

This phenomenon is counteracted by soaking rubber inflations in caustic solutions, which extract butterfat. At the same time, however, the caustic treatment degrades the rubber by increasing its porosity and continued absorption and fat removal ultimately lead to surface cracking in use. Thus, the caustic generates more and larger devices in which butterfat can collect, necessitating longer and more severe treatments, resulting in swelling and distortion.

As a rule of thumb, as soon as a rubber inflation develops a crack visible to the naked eye, it is discarded as unserviceable. The opacity of the rubber makes adequate inspection quite difficult. As a consequence, defective and incompletely sanitized rubber inflations are frequently kept in service because cracks have gone undetected. Even at that, the life expectancy of a rubber inflation, depending on quality and frequency of use, is from four months to one year, with six months being the average life expectancy.

Thus, there is a need for milking inflation which better satisfies the above criteria, and the present invention is addressed to filling this need.

We have found that the desiderata of the present invention can be met by a milking inflation formed of an elastomeric vinyl plastic. For purposes of this disclosure, an "elastomeric vinyl plastic" is intended to include, without limitation on the generality of the term, plasticized homopolymerizates of vinyl chlorides; and plasticized copolymerizates and interpolymerizates of vinyl chloride with a monoolefinic monomer, such as vinyl acetate, propionate or butyrate; acrylic and alpha-alkyl acrylic acids, their alkyl esters, amides and nitriles; and vinyl aromatics such as styrene, vinyl naphthalene, etc. Suitable plasticizers which may be used in the practice of this invention include, without limitation, di-2 ethyl hexyl phthalate, butyl phthalyl butyl glycollate, butyl benzyl phthalate, expoxidized soybean oil, di-2 ethyl hexyl adipate, and others.

The present may also be practiced with the fog-resistant PVC compositions disclosed in copending U.S. application Ser. No. 649,015 filed June 26, 1967. This application is incorporated herein by reference to the extent necessary for a complete understanding of the nature of the fog-resistant compositions it discloses.

As compared with rubber, elastomeric vinyl plastic inflations are more dense and less porous. Consequently, they absorb essentially no butterfat and can be thoroughly cleaned and sanitized under less severe conditions than are required for rubber inflations. This advantage significantly contributes to extending the useful life of an elastomeric vinyl plastic inflation to 2–3 times that for a rubber inflation.

Elastomeric vinyl plastic inflations can be made with optical properties varying from transparent to opaque. As compared with generally dark-colored, opaque, rubber inflations, transparent vinyl ones can readily be inspected for operativeness during milking, and for cleanliness and serviceability following cleaning and sanitization.

Another advantage of elastomeric vinyl plastic inflations is that they can be made by a variety of molding techniques, including injection, slush, rotational and dip molding.

Due to the fact that elastomeric vinyl plastics have slower distortion recovery rates than rubber, we have found it necessary to depart from the conventional construction of milking inflations, to accommodate the properties of elastomeric vinyl plastics.

In accordance with the present invention, there is provided an elastomeric vinyl plastic milking inflation comprising an elongated tubular body portion; a tubular, generally cylindrical, head portion merged with one end of the body portion and an integral flexile teat-receiving collar extending inwardly from generally the point of merger of the body and head portions; the collar being flexible between a relaxed position and a flexed position; and a plurality of means formed at the inner periphery of the collar and operative to extend substantially inwardly of the periphery when the collar distends toward the flexed position.

It is therefore an object of the present invention to provide an improved milking inflation.

A further object of the invention is to provide an elastomeric vinyl plastic milking inflation which overcomes certain disadvantages of milking inflations formed from natural and synthetic rubbers.

Another object of the invention is to provide a transparent milking inflation.

These and other objects and advantages will become apparent from the following detailed description of a preferred embodiment of the invention when read in connection with the accompanying drawings, in which.

Figure 1:
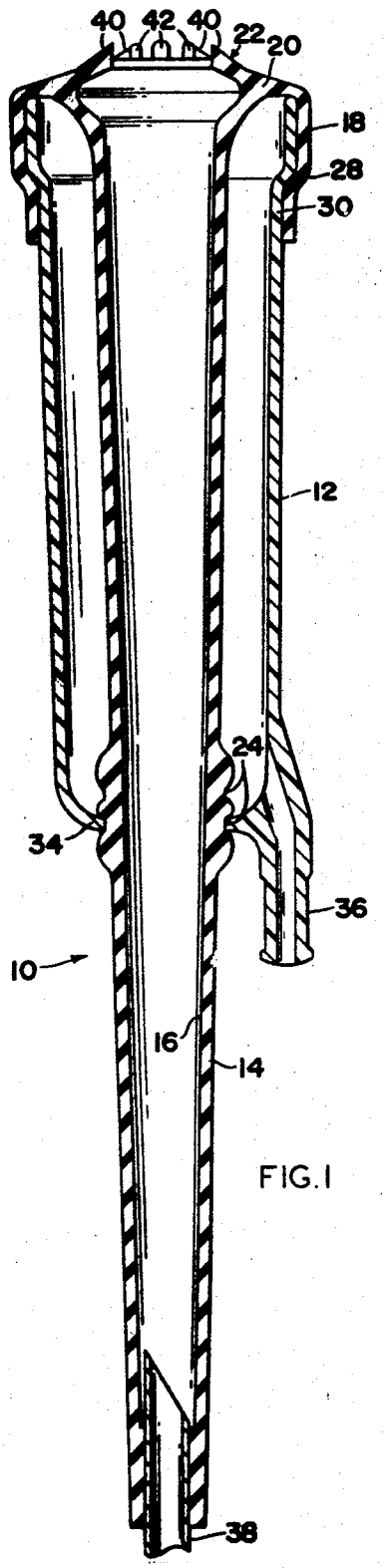
FIGURE 1 is a schematic section view of a milking inflation assembly comprising an elastomeric plastic milking inflation in accordance with the present invention.

Referring now to the drawings wherein the showings are for purposes of illustrating preferred embodiments of the inventions only, and not for the purpose of limiting the same, FIGURE 1 shows a milking inflation assembly comprising a flexible, elastomeric vinyl plastic, preferably transparent milking inflation designated generally as 10, and a rigid shell 12. The shell may be formed from a variety of materials such as metal or glass, but in the preferred embodiment illustrated is formed of a synthetic plastic material such as acrylates, e.g., methyl methacrylate, polycarbonates, polyphenylene, methylpentene, polysulfones, rigid vinyls, etc., and is preferably transparent.

Figure 2:
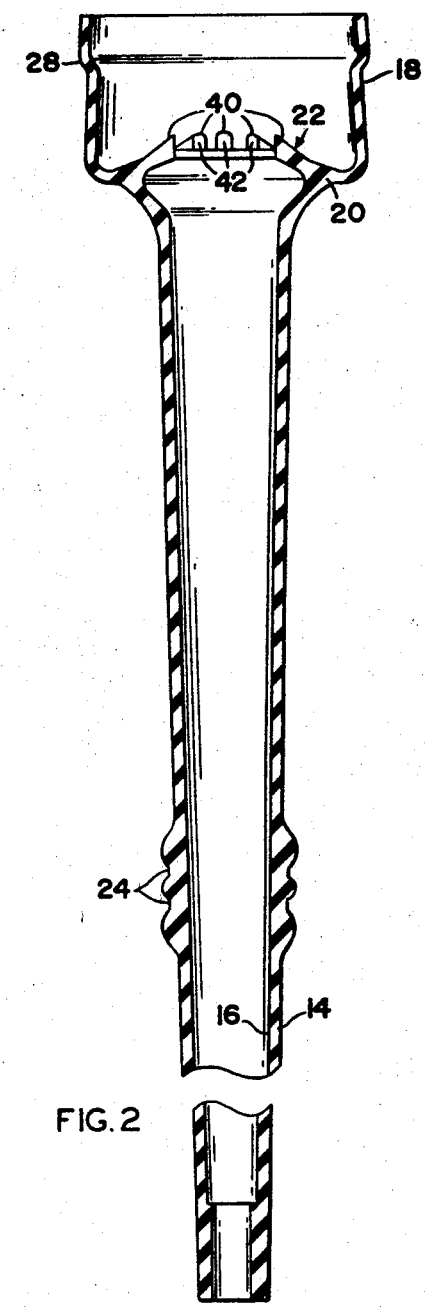
FIGURE 2 is a schematic section view of an elastomeric vinyl plastic milking inflation in accordance with the present invention.
Figure 4:
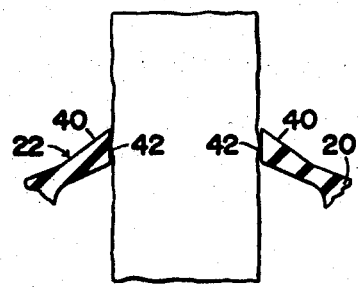
FIGURE 4 is a schematic section view of the milking inflation taken generally along line 4—4 of FIGURE 3.
Figure 6:
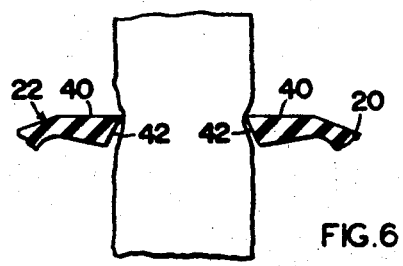
FIGURE 6 is a schematic section view taken generally along line 6—6 of FIGURE 5.

Milking inflation 10 comprises tubular body portion 14, having internal bore 16 of constant taper virtually the entire length thereof; tubular head portion 18 merged at 20 with wide end of tubular body portion 14; a flexile teat-receiving collar 22 extending inwardly generally from point of merger of body and head portions 14, 18, respectively. As best seen in FIGURES 4 and 6, collar 22 is flexible between a relaxed position as illustrated in FIGURE 4 and a flexed position as illustrated in FIGURE 6. As shown in FIGURES 1 and 2, a segment of the outer surface of body portion 14 is formed with a plurality of circumferential corrugations 24, the function of which will be described presently.

In the unfolded position shown in FIGURE 2, tubular head portion 18 is provided with an external circumferential ridge 28. When head portion 18 is folded down over shell 12, as illustrated in FIGURE 1, circumferential ridge 28 complements necked portion 30 at the upper end of the shell, forming a seal therebetween. In this manner the upper end of the shell 12 is held in sealing engagement between body portion 14 and head portion 18, when the latter is folded down over the shell. The lower end of the shell is maintained in sealing engagement with milking inflation 10, by the engagement of lip 34 between two successive circumferential corrugations 24.

Shell 12 is further provided with aperture means including tube 36 adapted to be connected to a source of pulsating vacuum (not illustrated), forming no part of the present invention.

The lower end of tubular body portion 14 is adapted to communicate with a conventional "claw," fragmentarily shown as 38, which in turn communicates with a source of constant vacuum, as is well known in the art. In this manner milk flowing down the body portion of milking inflation 10 is suitably collected.

With vacuum drawing both on the inside of milking inflation 10, and on the chamber formed between the inflation and shell 12, the enrobed teat is caused to distend, resulting in ejection of milk. In reaction to the distension, the inflation assembly rides up on the teat. Unless some means are provided for breaking the suction of the milking inflation on the cow's teat, the inflation will continue to rise up on the teat with each pulse of vacuum exerted on the chamber surrounding the inflation. Eventually, this will apply enough pressure to the teat and the juncture of the teat with the udder, to cause severe pain and rupture blood vessels.

In view of the slower distortion recovery rates of elastomeric vinyl plastics, as compared with rubber, we have found it necessary to provide collar 22 with novel means along its inner periphery, which will not interfere with the necessary vacuum seal required during certain portions of the milking cycle, but at the same time will provide a positive break in the seal to prevent the riding-up condition described above. To this end, collar 22 is provided with a plurality of means formed at its inner periphery, which are retracted when collar 22 is in a relaxed position, and operative to extend substantially inwardly of the periphery when the collar distends toward a flexed position, as when the milking inflation rides upwardly in response to the pull of vacuum.

Figure 3:
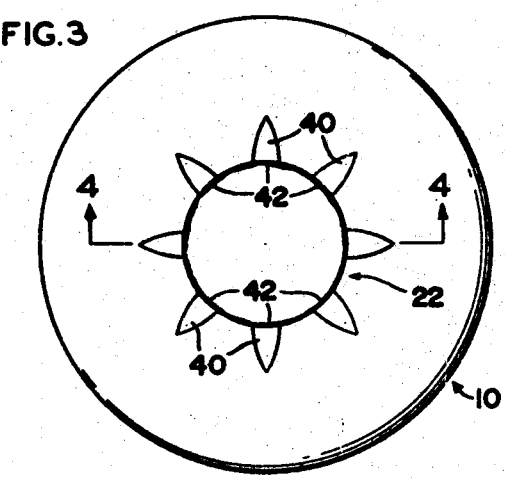
FIGURE 3 is a schematic top view of an elastomeric vinyl plastic milking inflation in its relaxed position.
Figure 5:
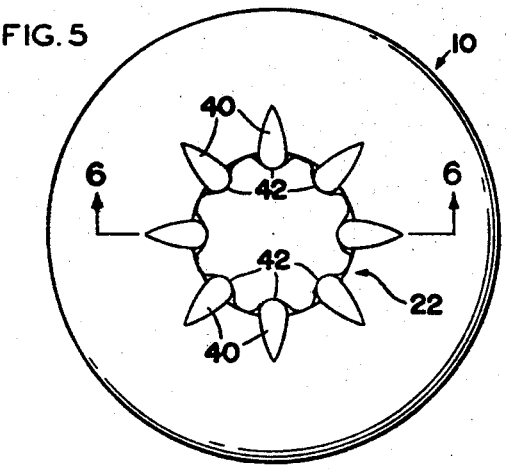
FIGURE 5 is a schematic top view of the milking inflation in its distended position.

FIGURES 3 and 4 show collar 22 in its relaxed position, and FIGURES 5 and 6 show the collar in its flexed position.

While the means for effecting a vacuum break may take a variety of forms, in the preferred embodiment illustrated, the means take the form of a plurality of fingers 40 each configured with a plane surface or chisel-face 42, which face is generally parallel to the major axis of tubular body portion 14 when collar 22 is in its relaxed position (FIGURES 3 and 4) and is at an acute angle with respect to the major axis when the collar is in its flexed position (FIGURES 5 and 6).

With collar 22 in its relaxed position, as is the case when the chamber between the shell and milking inflation is under atmospheric pressure or just beginning the vacuum portion of the milking cycle, chisel-faces 42 of fingers 40 are disposed parallel to the surfaces of the cow's teat. Together with the remainder of the inner periphery of collar 22, fingers 40 contribute to forming a vacuum seal between the teat and the milking inflation. This is illustrated in FIGURES 3 and 4.

However, as the vacuum pulling portion of the milking cycle progresses, and the teat is drawn into the milking inflation, or conversely the milking inflation rides up on the teat, the frictional engagement of chisel-faces 42 with the surface of the teat, cause the former to bend downwardly, whereby the fingers extend substantially inwardly of the periphery of collar 22. This reduces the net diameter of the opening in the collar, developing air spaces along the inner periphery of the collar between the points of contact of the fingers of the teat. Air can then rush in through the gaps between the teat and the inner periphery of collar 22 breaking the vacuum seal as illustrated in FIGURES 5 and 6, and facilitating the evacuation of milk from the inflation. With the interruption of vacuum on the chamber between the shell 12 and the encased section of tubular body portion 14, inflation 10 is pinched just below the teat end, stopping the flow of milk. At this point, collar 22 returns to its relaxed position as shown in FIGURES 3 and 4, so that there is no net ride-up of the inflation on the teat.

The vinyl plastic milking inflations of the present invention can be made from a variety of vinyl resin compositions, in various physical forms such as plastisols, organosols, dry resin blends, etc. depending on the molding technique employed. For illustrative purposes only, the following vinyl resin plastisol composition is useful in the practice of the present invention by a dip molding method.

| Ingredient: | Parts by wt. |
|---|---|
| Emulsion grade PVC resin | 100 |
| Di-2 ethyl hexyl phthalate (plasticizer) | 60 |
| Epoxidized soybean oil (plasticizer) | 20 |
| Calcium zinc paste (stabilizer) | 3 |

Each of these ingredients is a commercial commodity, and is readily available from a number of manufacturers.

Manufacturer's data for an emulsion grade PVC resin useful in practicing the present invention, are as follows:

| | |
|---|---|
| Appearance | White powder |
| Specific viscosity | 0.50–0.52 |
| Average apparent density (lb./cu. ft.) | 15–19 |
| Specific gravity | 1.40 |
| Heat loss (maximum percent) | 0.50 |
| Ash content (percent), maximum | 0.50 |

Manufacturer's data for an epoxidized soybean oil useful in practicing the present invention, are as follows:

| | |
|---|---|
| Color | 2 |
| Specific gravity | 0.994 |
| Lb. per gallon | 8.25 |
| Viscosity: | |
| Strokes | 4.0 |
| Centipoise | 400 |
| Acid value | 0.3 |
| Molecular weight | 1000 |
| Refractive index | 1.471 |
| Odor | Faint |
| Flash point | ° F__ 585 |
| Fire point | ° F__ 640 |
| Pour point | ° F__ 25–35 |

Manufacturer's data for a calcium zinc paste useful in practicing the present invention, are as follows:

PRODUCT DESCRIPTION

A fluid paste stabilizer containing USFDA approved non-toxic compounds of calcium and zinc.

PHYSICAL PROPERTIES

Form.—Fluid paste.
Color.—White.
Solubility.—Insoluble in most common solvents and plasticizers but may be dispersed by simple milling or grinding—completely compatible with PVC and copolymer resins in the fused state.
Toxicity.—Approved by U.S. Food and Drug Administration for use in food packaging applications.

As previously noted, the milking inflations of the present invention can be made by a number of molding techniques, and for illustrative purposes only, a dip molding technique will be described.

Figure 7:
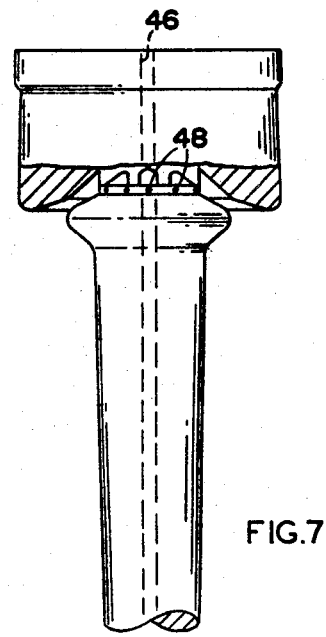
FIGURE 7 is a schematic pictorial view of a form which may be used in accordance with one method of making an elastomeric vinyl plastic milking inflation.

In practicing this method, use is made of a form having linear portions corresponding to the desired internal configuration of tubular body portion 14, the internal and external configurations of collar 22, and the external configurations of collar 22, and the external configuration of head portion 20. Such a form is illustrated in FIGURE 7 and it will be seen that this form will produce a milking inflation with head portion 18 in its unfolded configuration as illustrated in FIGURE 2. The advantages of using such a form is that it provides the inflation with exceedingly smooth interior and exterior surfaces, which are free of seams, flashing and other similar imperfections. One disadvantage of using such a form, and an advantage of injection molding, is that in dip molding corrugations 24 must be added to body portion 14 as a separate sleeve, while these corrugations can be integrally molded in an injection molding process.

The form illustrated in FIGURE 7 can be made from various materials but in the preferred embodiment illustrated is made of chrome plated carbon steel. The form is preheated in an air circulating oven for about 15 minutes at about 500° F. The preheated form is immersed in and withdrawn from a liquid vinyl resin-containing medium such as the above described plastisol composition, for a time sufficient to cause a coating of desired thickness to build up on the form. Generally the dipping and withdrawal cycle takes about 2 minutes. Thereafter the coated form is placed in a 500° F. oven for about 3 minutes to fuse the coating. This is followed by a water quench.

The cured inflation is then removed from the form, with the assistance of air under pressure introduced through passage 46 and exiting through the bottom of the form, and through a peripheral arrangement of apertures 48 positioned just below the fluted portions of the form which develop fingers 40. After removal of the inflation from the form, head portion 18 is folded down over body portion 14, and the inflation is ready for assembly with shell 12, as illustrated in FIGURE 1.

The present invention has been described in conjunction with certain structural embodiments; however, it is to be appreciated that various structural changes may be made in the illustrated embodiments without departing from the intended scope and spirit of the present invention.

Having thus described our invention, we claim:

1. An elastomeric vinyl plastic milking inflation comprising an elongated, tubular body portion; a tubular, generally cylindrical head portion merged with one of said body portion, and an integral, flexible, teat-receiving collar extending inwardly from generally the point of merger of said body and head portions; said collar being flexible between a relaxed position and a flexed position; and a plurality of projecting means formed at the inner periphery of said collar and extending substantially inwardly of said periphery when said collar distends toward said flexed position.

2. The milking inflation as defined in claim 1 wherein said tubular body portion presents an internal bore of constant taper, virtually the entire length thereof, and said head portion is merged with the end of said tubular body portion having the wide internal bore.

3. The milking inflation as defined in claim 1 wherein said means formed at the inner periphery of said collar are a plurality of discrete fingers.

4. The milking inflation as defined in claim 3 wherein each of said fingers is configured with a plane surface, which is generally parallel to the major axis of said tubular body portion when said collar is in said relaxed position, and is at an acute angle with respect to said major axis when said collar is in said flexed position.

5. The milking inflation as defined in claim 1 wherein said vinyl plastic is transparent.

6. The milking inflation as defined in claim 5 in which a segment of the outer surface of said body portion is formed with a plurality of circumferential corrugations.

7. In combination with the milking inflation defined in claim 6, a substantially rigid, transparent shell enveloping a section of said body portion; one end of said shell being sealingly engaged between said body portion and said cylindrical head portion folded down over the shell; the other end of said shell being sealingly engaged between two of said plurality of circumferential corrugations; and aperture means in said shell adapted to communicate the interior of said shell with a source of vacuum.

8. The combination as defined in claim 7 wherein the outer surface of said cylindrical head portion is provided with a circumferential groove adapted to receive annular retainer means, operative to assist in sealing the said one end of said shell.

9. An elastomeric vinyl plastic milking inflation comprising an elongated, tapered, tubular body portion; a tubular, generally cylindrical head portion merged with the wider end of said body portion, with an integral, flexible, teat-receiving collar extending inwardly from generally the point of merger of said body and head portions, a plurality of discrete fingers formed at the inner periphery of the collar said fingers having on their ends chisel-faces, said collar being flexible between (1) a relaxed position wherein the chisel-faces of said fingers are generally parallel to the major axis of said body portion, and (2) a flexed position whereat the chisel-faces of said fingers are at an acute angle with respect to said major axis.

10. The milking inflation as defined in claim 9 wherein said vinyl plastic is transparent.

References Cited

UNITED STATES PATENTS

| 1,260,466 | 3/1918 | Sharples | 119—14.53 |
| 2,340,295 | 2/1944 | Bender | 119—14.52 |
| 3,308,788 | 3/1967 | Noorlander | 119—14.52 |
| 3,272,179 | 9/1966 | Troberg | 119—14.49 |

ALDRICH F. MEDBERY, Primary Examiner